(12) United States Patent
Artusi (10) Patent No.: US 11,906,819 B2
(45) Date of Patent: Feb. 20, 2024

(54) FRAME FOR SPECTACLES (71) Applicant: SAFILO SOCIETÀ AZIONARIA FABBRICA ITALIANA LAVORAZIONE OCCHIALI S.P.A., Padua (IT)

(72) Inventor: Ampelio Artusi, Padua (IT)

(73) Assignee: SAFILO SOCIETÀ AZIONARIA FABBRICA ITALIANA LAVORAZIONE OCCHIALI S.P.A., Padua (IT)

( * ) Notice: Subject to any disclaimer, the term of this patent is extended or adjusted under 35 U.S.C. 154(b) by 646 days.

(21) Appl. No.: 17/050,934

(22) PCT Filed: Apr. 18, 2019

(86) PCT No.: PCT/IB2019/053222
§ 371 (c)(1),
(2) Date: Oct. 27, 2020

(87) PCT Pub. No.: WO2019/207431
PCT Pub. Date: Oct. 31, 2019

(65) Prior Publication Data
US 2021/0231971 A1    Jul. 29, 2021

(30) Foreign Application Priority Data
Apr. 27, 2018    (IT) .................. 102018000004951

(51) Int. Cl.
*G02C 5/22* (2006.01)
*G02C 5/14* (2006.01)

(52) U.S. Cl.
CPC ............ *G02C 5/2209* (2013.01); *G02C 5/146* (2013.01)

(58) Field of Classification Search
None
See application file for complete search history.

(56) References Cited

U.S. PATENT DOCUMENTS

| 368,852 A | 8/1887 | Ramsay | |
|---|---|---|---|
| 4,780,928 A * | 11/1988 | De Lorenzo Poz | . G02C 5/2209 16/257 |

(Continued)

FOREIGN PATENT DOCUMENTS

| DE | 102013007173 A1 | 10/2014 |
|---|---|---|
| EP | 0877278 A1 | 11/1998 |

(Continued)

*Primary Examiner* — Darryl J Collins
(74) *Attorney, Agent, or Firm* — Volpe Koenig (57) ABSTRACT

A frame for spectacles includes a front mount with respective lateral lugs provided for articulation of respective arms producing an articulated connection of each arm to the front mount. Each lug includes a hinge pin extending between a pair of surfaces of the lug axially opposite each other in a hinge axis direction. Each arm includes a first arm portion extending as a second arm portion with a lesser longitudinal extent with respect to the first arm portion. The second arm portion is bent on the first portion in a position facing it, the pin is interposed between the first arm portion and second arm portion in order to produce a hinge connection. The second arm portion having a convex portion directed towards the first arm portion, which at least partially surrounds the pin so that relative positioning is maintained between the arm and pin during rotation of the arm.

6 Claims, 8 Drawing Sheets

(56) References Cited

U.S. PATENT DOCUMENTS

| | | | | |
|---|---|---|---|---|
| 5,959,715 | A * | 9/1999 | Jaffelin | G02C 5/2254 |
| | | | | 351/114 |
| 6,116,733 | A * | 9/2000 | Krumme | G02C 5/00 |
| | | | | 351/114 |
| 6,826,801 | B1 * | 12/2004 | Fuchs | G02C 5/2209 |
| | | | | 16/228 |
| 6,978,511 | B2 * | 12/2005 | Poton | B60S 1/40 |
| | | | | 15/250.43 |
| 8,827,444 | B1 * | 9/2014 | Koo | G02C 5/2254 |
| | | | | 351/111 |
| 2002/0054272 | A1 * | 5/2002 | Ebata | G02C 5/2209 |
| | | | | 351/111 |

FOREIGN PATENT DOCUMENTS

| | | |
|---|---|---|
| EP | 1319971 A1 | 6/2003 |
| WO | 2012074414 A1 | 6/2012 |

\* cited by examiner

FRAME FOR SPECTACLES

TECHNICAL FIELD

The present invention relates to a frame for spectacles having the features set out in the preamble of main claim 1.

Technological background

There are well-known in the specific technical field frames for spectacles in which the articulation of the arms to the front mount is carried out by means of hinge devices having respective pins and eyelet-like seats which are mutually associated rotatably, the hinge elements of such devices being advantageously fixedly joined to the arm and the lug of the frame.

This type of solution, in the large number of versions available in the prior art, conventionally involves some limitations, including the possible undesirable loosening of the screw or the hinge pin, the need for producing a plurality of components required for the hinge type articulation, the spatial requirements required by the necessary component parts, as well as the weight itself of the hinge type device which is not very suitable for being used in frames of the lightweight type.

Description of the invention

A main object of the invention is to provide a frame for spectacles in which the articulation between the arm and the lug, while still being produced with a hinge pin, is obtained with a structural simplification of the components which form the hinge and which at the same time is particularly stable, in all the positions of the arm between the extreme conditions of opening and closing on the frame.

Another object is to produce a frame with a hinge type articulation structure of the arm which is easy to assemble, has a particularly low weight and small dimensions so as to be also able to be used in particularly slender and light frames, but which at the same time ensures a high level of stability of relative connection both during the movement of the arm and in the extreme positions of opening and closing on the frame.

This object and other objects which will be better appreciated below are achieved by a frame for spectacles constructed according to the appended claims.

BRIEF DESCRIPTION OF THE DRAWINGS

Other features and advantages of the invention will be better appreciated from the following detailed description of a preferred embodiment thereof which is illustrated, by way of non-limiting example, with reference to the appended drawings, in which:

FIG. 16 is a cross-section along the line XVI-XVI of FIG. 15, FIGS. 17, 18 and 19 are partial perspective views of different steps of the articulation assembly of the arm about the hinge pin of the frame.

PREFERRED EMBODIMENTS OF THE INVENTION

Figure 1:
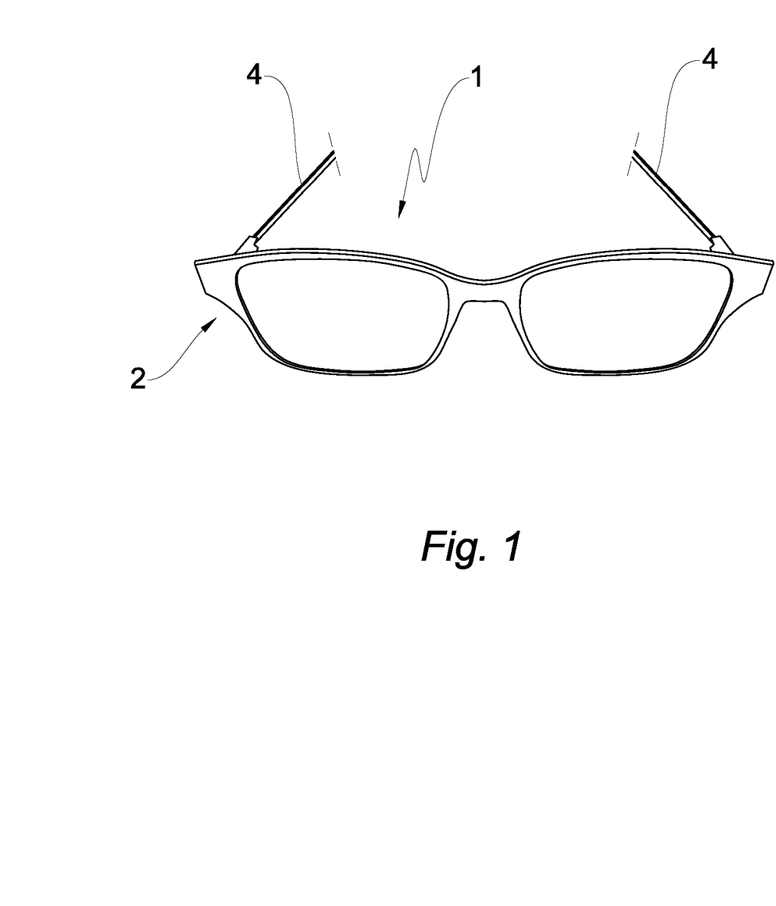
FIG. 1 is a perspective view of an example of a frame for spectacles produced according to the present invention.
Figure 2:
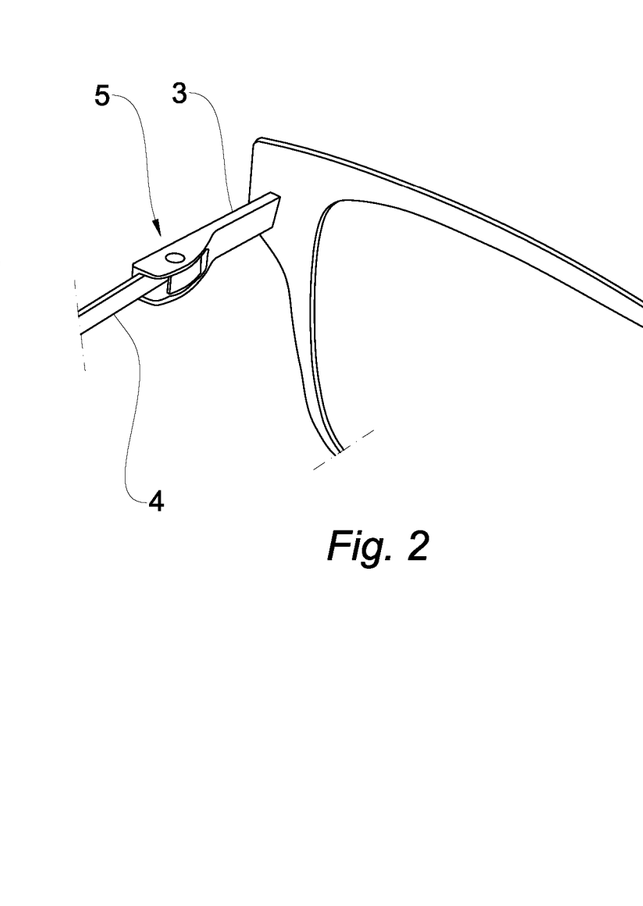
FIGS. 2 and 3 are partial perspective views, to an enlarged scale, of a detail of the frame of the preceding Figure, in relation to the articulation of one of the arms to the relevant front lug of the frame.
Figure 3:
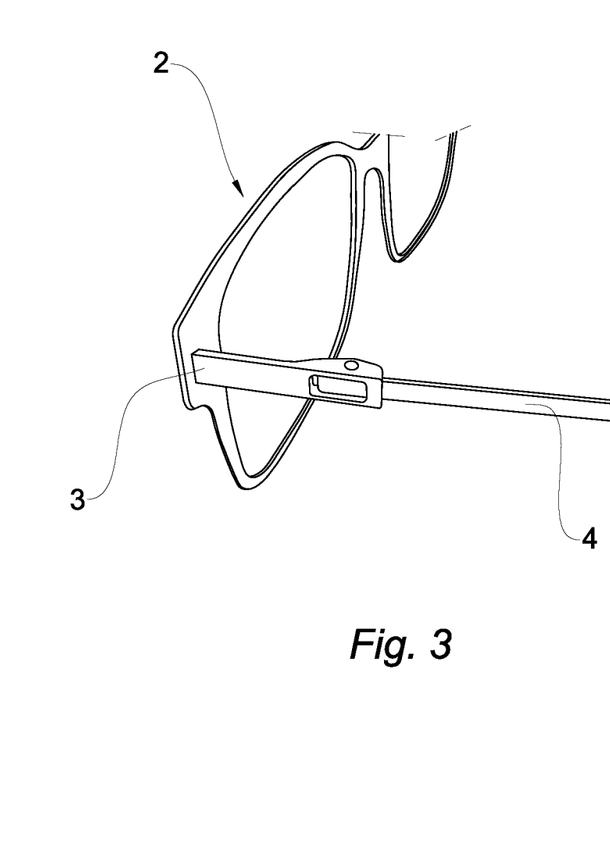
Figure 4:
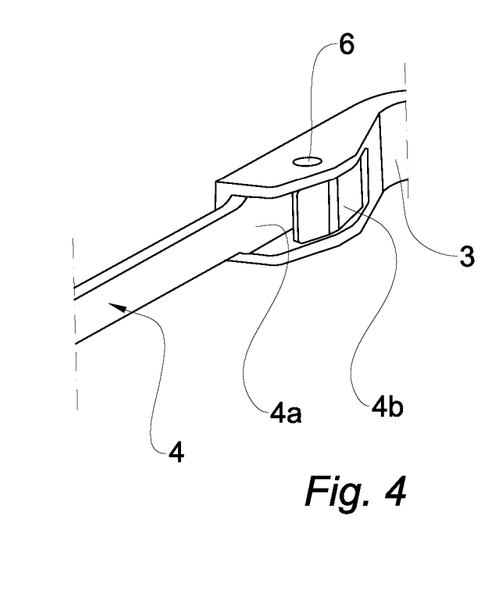
FIG. 4 is a perspective view, to an enlarged scale, of a detail of the preceding Figures.
Figure 5:
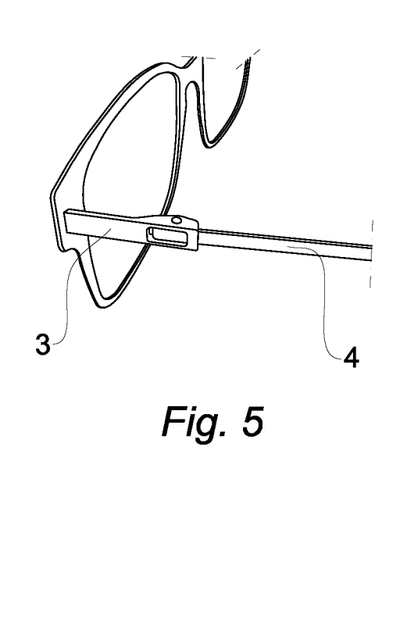
FIGS. 5, 6 and 7 are perspective views of the detail of FIG. 3, during the movement sequence for articulation of the arm to the frame.
Figure 6:
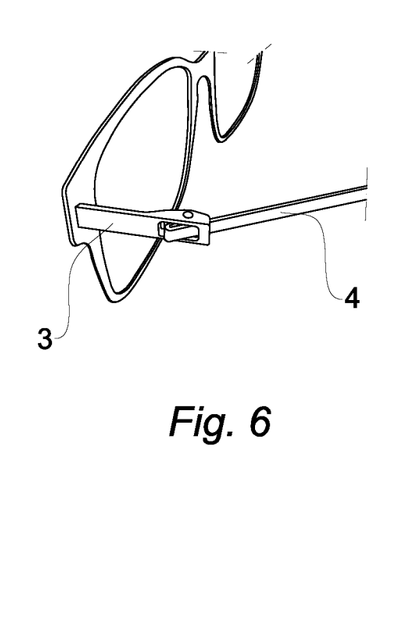
Figure 7:
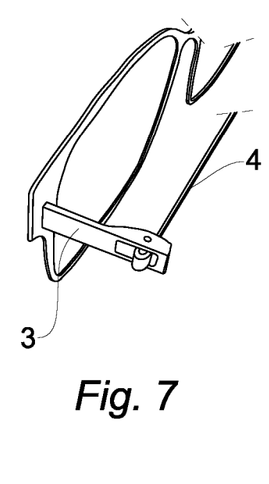

With reference to the cited Figures, there is generally designated 1 a frame for spectacles which is produced according to the present invention, comprising a front mount 2, for retaining lenses (not illustrated), which is provided with a pair of opposing lateral lugs 3 which are provided for the articulated connection of respective arms 4 to the front mount. In order to connect each arm 4 to the corresponding lug 3, the frame comprises respective articulation means, which are generally designated 5 and which are suitable for producing the articulated connection of each arm to the front mount in order to allow the rotation, about an articulation axis X, of each arm with respect to the front mount, between corresponding opening and closing positions. As a result of the structural and functional identity, there will be described in detail below the articulation means of only one of the arms 4 with respect to the front mount 2 of the frame.

As can be seen in the Figures, each lug 3 is provided with a hinge pin 6 which extends between a pair of surfaces 3a, 3b of the lug which are axially opposite each other in the direction of the hinge axis X.

Figures 21, 22, 23:
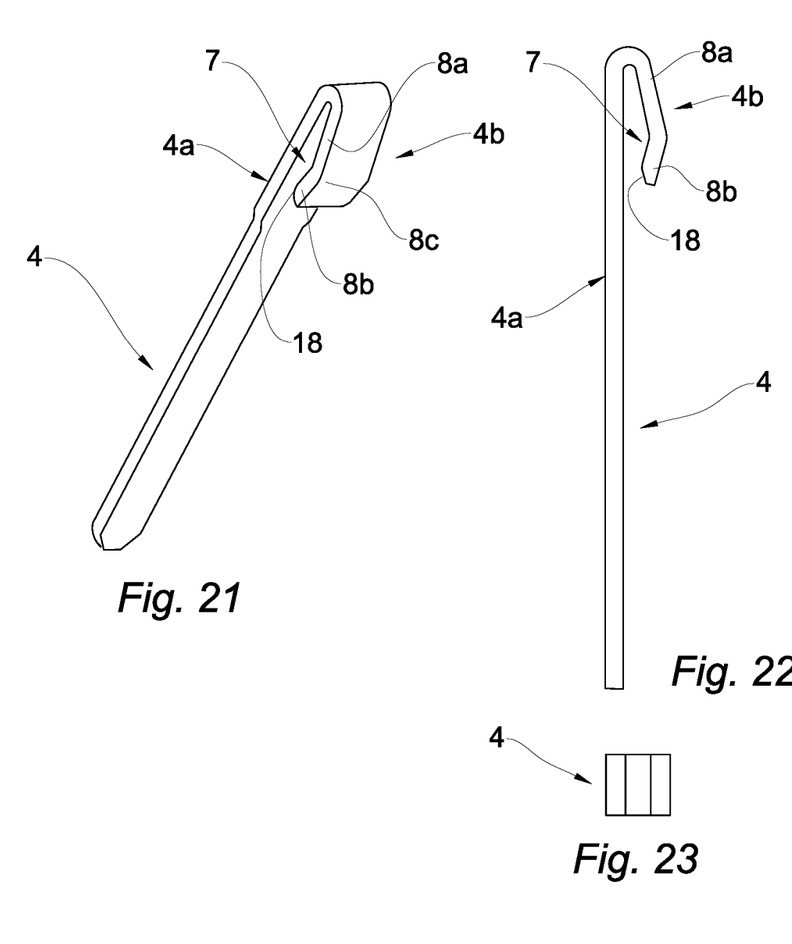
FIGS. 21, 22 and 23 are perspective views, as a side view and as a plan view, of the arm of the preceding Figures.

Each arm 4 comprises a first arm portion 4a which is extended as a second arm portion 4b and which has a lesser longitudinal extent with respect to the first arm portion, and the second arm portion 4b is bent on the first portion 4a in a position facing it, assuming a hook-like formation, as clearly illustrated in the Figures, in particular in FIG. 21.

The pin 6 is intended to be interposed between the first arm portion and the second arm portion in order to produce the hinge type connection of the arm 4 with respect to the pin 6, and the second arm portion 4b has a portion 7 with a convex profile which is directed towards the first arm portion 4a, the portion 7 having the convex profile at least partially surrounding the pin 6 so that the relative positioning is maintained between each arm and the corresponding pin during the rotational movement of the arm. The arms 4 have a preferred plate-like formation with a small thickness. In other words, the cross-section of the arm has a height dimension of the arm, measured substantially parallel with the temple zone of the head with the spectacles being worn, which is far greater than the thickness of the arm measured transversely relative to the height. The formation of the section with a small thickness, together with the selection of materials from which it is formed, preferably metal materials, generally confers on the arm characteristics involving great lightness, with small dimensions, over a longitudinal extent of the arm which is particularly slender and so as to further confer on the frame an overall design with a considerable aesthetic impact. In this regard, a structure with a metal plate of small thickness is particularly suitable for forming the arms and the front mount of the frame.

In accordance with the plate-like structure mentioned above, the hook-like formation of the arm can be readily obtained by bending it, forming the second arm portion which is bent on the first portion so as to face it. Such a configuration may be obtained from the plate-like structure of the arm, which is substantially flattened, for example, obtained from a metal plate, by means of bending of the second arm portion 4b through approximately 180° on the first arm portion 4a.

The portion 7 with a convex profile can be further obtained by means of an additional bending of the free end of the second arm portion 4b, in the same bending direction with which the second arm portion is bent on the first portion.

In greater detail, there are defined on the second arm portion two parts 8a, 8b, which are contiguous and angled relative to each other and which converge in a common vertex 8c, in order to produce the portion 7 having the convex profile, the portion 7 being capable of partially surrounding, with supporting contact, the external covering of the hinge pin 6, retaining the arm in a relative position with respect to the lug, though with rotational freedom about the hinge pin.

Figures 11, 12, 13, 14:
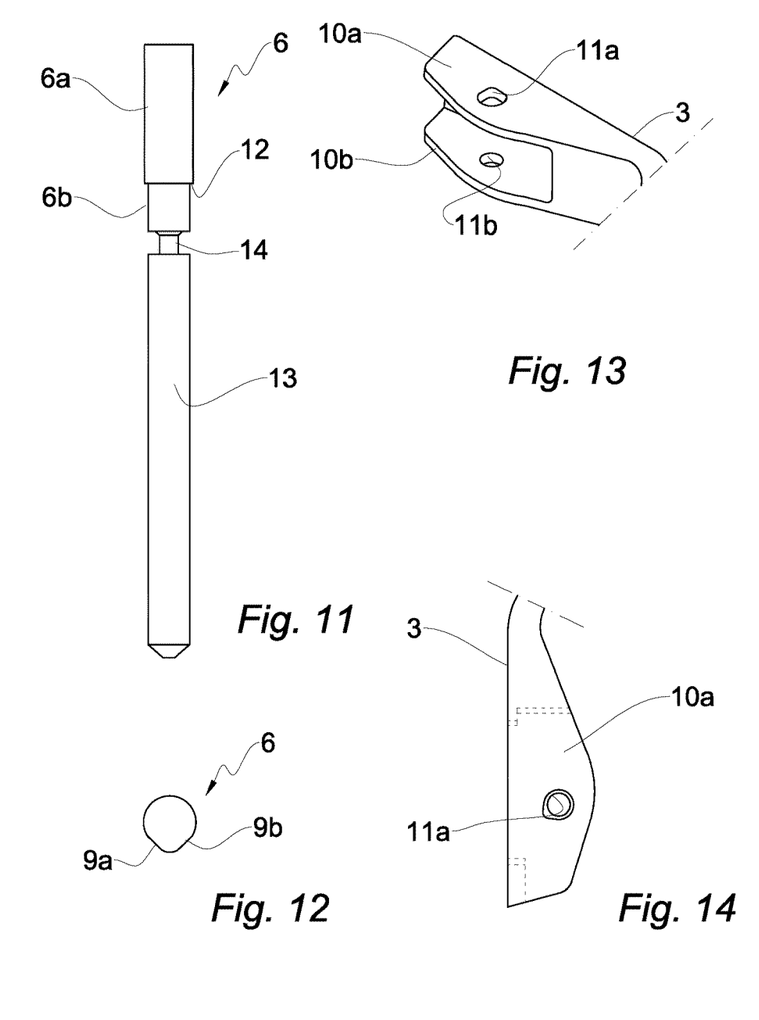
FIGS. 11 and 12 are a front view and plan view of a detail of the frame according to the invention, respectively, from which the hinge pin is constructed.
FIGS. 13 and 14 are a perspective view and plan view of a detail of the frame, respectively, which forms the lug for articulating the corresponding arm to the frame.
Figure 15:
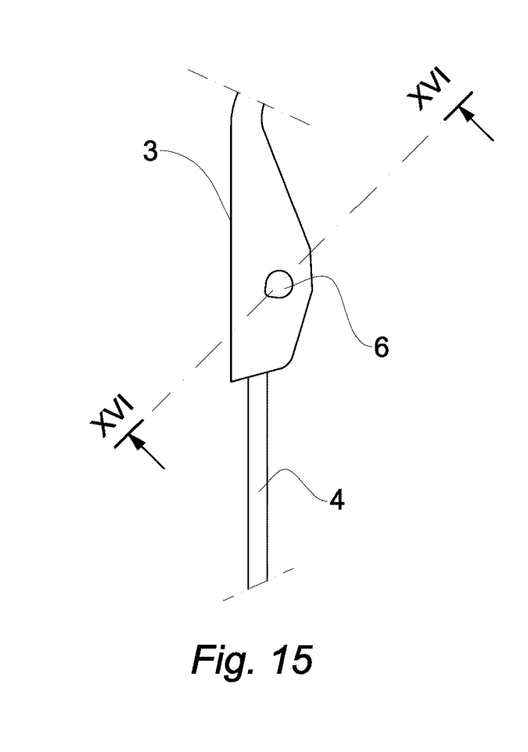
FIG. 15 is a view corresponding to the view of FIG. 14, in which the arm articulated to the respective lug is partially shown.

The pin 6 has a main portion 6a which has an eccentric cross-section, as clearly illustrated in FIG. 12. The external covering of the pin has a cam type formation with a pair of planar lateral surfaces 9a, 9b which are angled relative to each other substantially perpendicularly and which are connected to the remaining external cylindrical profile of the pin. The cam type cross-section is uniform over the longitudinal extent of the main portion 6a, which is extended as a second portion 6b which has a smaller diameter and a smaller longitudinal extent.

There are designated 10a, 10b a pair of wings which extend in the lug and which are mutually parallel and spaced apart and which carry the respective surfaces 3a, 3b, between which the hinge pin 6 is blocked. There is formed in the wing 10a, which is arranged above the wing 10b when the frame is worn on the face, an eyelet-like through-opening 11a which has a formation corresponding to the eccentric cross-section of the pin, and which has such dimensions as to allow the passage of the pin with limited connection play. There is formed in the opposing lower wing 10b a through-hole 11b which is coaxial with respect to the eccentric opening 11a and which has such a diameter as to allow the passage with limited connection play of the pin portion 6b.

There is defined between the portions 6a and 6b of the pin an abutment 12 which is intended to move into abutment against the surface of the wing 10b, following the insertion of the pin between the wings 10a, 10b.

The free end of the portion 6b, once the pin is inserted between the wings 10a, 10b of the lug, is further intended to be turned over again with plastic deformation, by means of which there is produced a widening or increase which is used to prevent the pin from falling through the hole 11b and consequently preventing it from also leaving the opening 11a.

In order to simplify the application of the pin to the lug, the pin 6 is formed with an extension in the form of a thin shank 13 which extends coaxially from the lower pin portion 6b. There is provided between the portion 6b and the shank 13 a section 14 of reduced diameter which constitutes a suitable cutting or breaking section in order to separate the shank 13 from the pin 6 readily.

Figure 8:
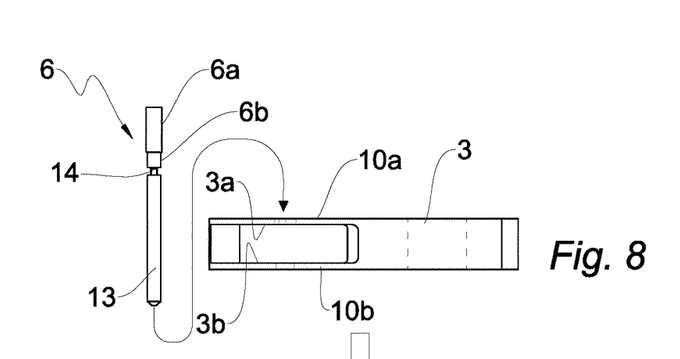
FIGS. 8, 9 and 10 are side views of a detail of the frame of the preceding Figures during the assembly sequence of the hinge pin.
Figure 9:
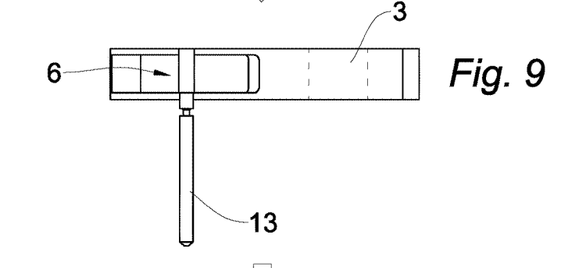
Figure 10:
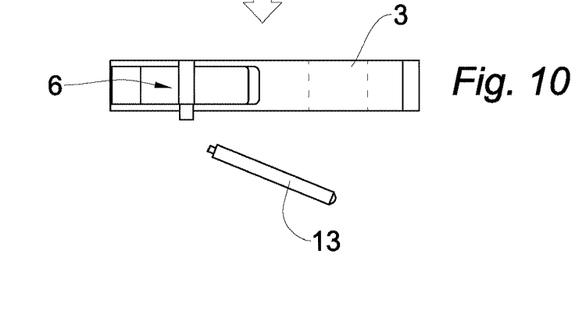

With particular reference to FIGS. 8 to 10, the pin 6 is applied to the lug before the articulated connection of the arm to the lug.

The pin which is formed in one piece with the shank 13 is inserted from the upper side of the lug, as illustrated in FIG. 8, passing through the upper opening 11a and the hole 11b. During this insertion step, the extension of the shank 13 makes it easier to insert the pin in the eccentric opening and in the hole which are provided in the lug. Reaching the position of FIG. 9, in which the pin 6 abuts with the abutment 12 against the corresponding lower wing 10b, the pin has the extension shank 13 thereof removed so as to reduce the overall axial extent thereof to the dimension which is provided for use. The separation of the shank is readily brought about by means of cutting or breaking the section 14 (FIG. 10).

Figure 16:
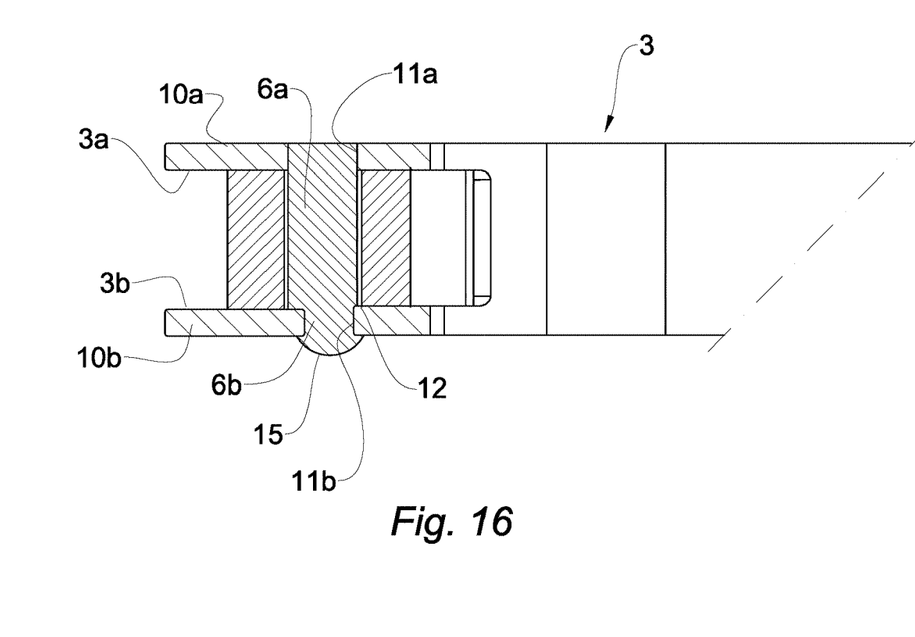
Figure 17:
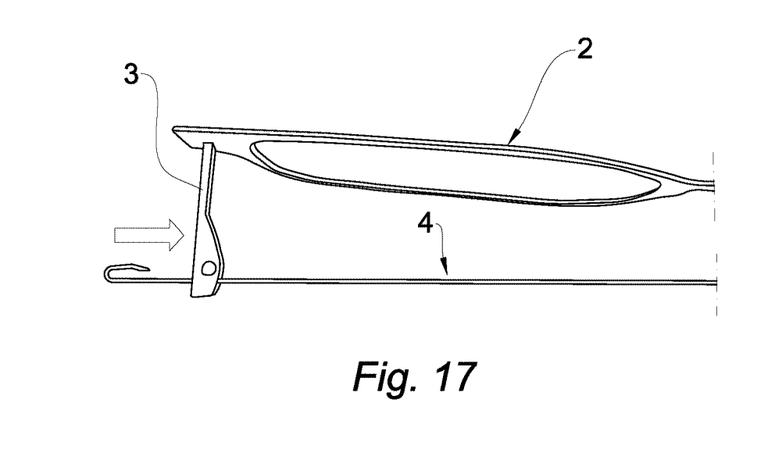
Figure 18:
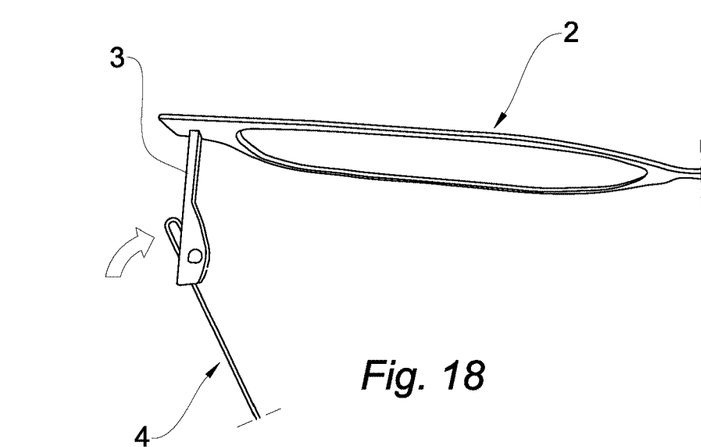
Figure 19:
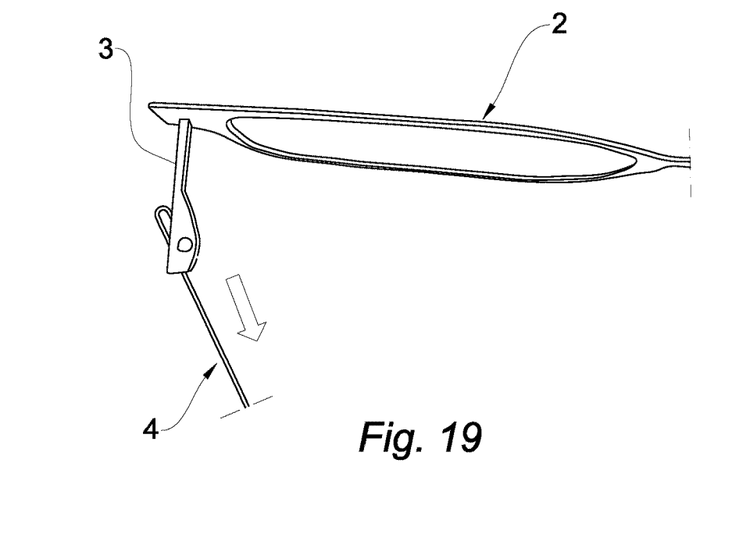

Once the shank 13 has been removed, the lower end of the pin portion 6b is turned over again so as to obtain a type of lower "head" or "widening" of the pin portion, which is designated 15 in FIG. 16 and which has a diameter which is greater than the diameter of the hole 11b. Consequently, the pin 6 is blocked in the lug, without it being possible to be removed therefrom.

There is designated 16 a hole which is provided in each lug and which is delimited vertically by the opposite wings 10a, 10b, the opening being formed so as to extend through the lug transversely to the direction of the hinge axis. The hole 16 is intended to be passed through, at least partially, by the first and second arm portions during the rotational movement of the arm about the pin, as will be clearly appreciated from the following description.

The lug 3 further comprises a surface 17 which extends at the side of the hole 16 and which is intended to abut the first arm portion, thereby defining a type of travel limit of the opening rotational movement of the arm.

The connection of the arm 4 to the pin 6 is brought about with a resilient preloading which is obtained by means of a slight resilient divergence between the first and second arm portions brought about during assembly of the arm with the pin.

In other words, the arm is connected to the pin so as to be urged into a slight resilient divergence. The dimension of the section of the pin therefore has to be greater than the maximum spacing between the two branches of the arm, if measured in a rest position.

As a result of this arrangement, during assembly a resilient pretensioning or preloading is established in the arm.

The resilient preloading ensures the continuation of adequate friction forces during the rotation of the arm about the pin, which friction is also referred to in the sector in question as "friction of the hinge" and which is always pursued where possible, because it imparts to the mechanism a greater stability and regularity in terms of operation (and consequent perception of greater quality of the product). The friction of such a hinge is further intended to be durable over time, given that precisely as a result of the resilient preloading induced during assembly, there are compensated for the potential reductions of the friction forces resulting from the dimensional variations (reductions) of the section of the pin and/or in the thickness of the arm caused by the wear of the respective materials.

If necessary, if the resilient return of the arm is insufficient to compensate for the potential reduction of the wear (for example, following use which is particularly long over time), with the condition of having produced the arm from suitable material, it is possible to plastically deform the second arm portion, that is to say, the portion with a convex profile, in order to move the two angled portions thereof towards the first arm portion and thereby to reduce the space between the first arm portion and the second arm portion so as to bring this space back to a dimension which is slightly less than that of the cross-section of the pin, and thereby to restore a sufficiently high value for the friction force. This operation is possible because the disassembly and re-assembly of the arm in the lug are very simple to carry out.

FIGS. 17 to 20 show the assembly sequence of the arm on the lug of the frame. The connection is brought about by insertion of the arm at the external side of the lug through the hole 16, as indicated by the arrow illustrated in FIG. 17.

Figure 24:
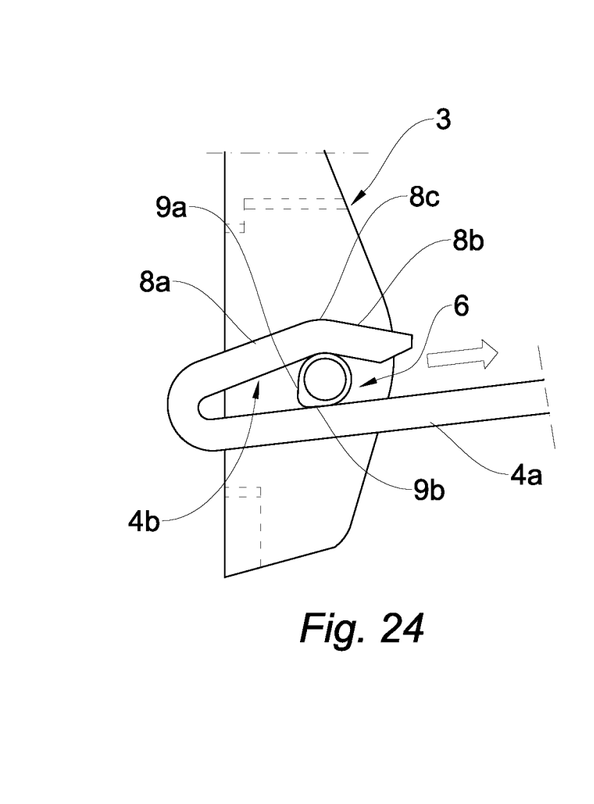
FIG. 24 is a schematic view to an enlarged scale of the hinge type articulation zone of the arm with respect to the frame.

During insertion into the lug, the optimum orientation of the arm is not exactly the one corresponding to the position of the "closed arm" (angled through 90° with respect to the lug) but instead the one corresponding to a slight angular deviation with respect to this position, as illustrated in FIG. 24.

With such an entry angle, in fact, the pin 6 presents to the arm 4 a cross-section with a smaller dimension and therefore the divergence required for the arm for abutment about the pin is slight. Consequently, the effort necessary to overcome the resilient resistance of the arm is modest and the assembly operation is easy.

Figure 20:
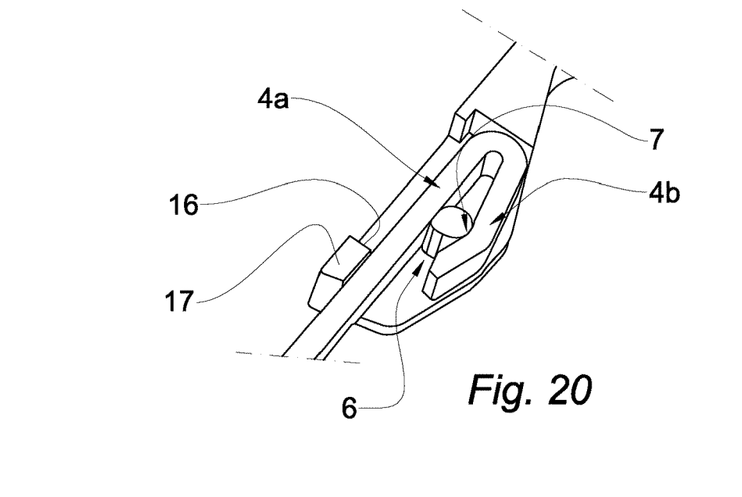
FIG. 20 is a perspective view of a detail as a partial cross-section of the hinge type articulation lug of the arm.
Figure 25:
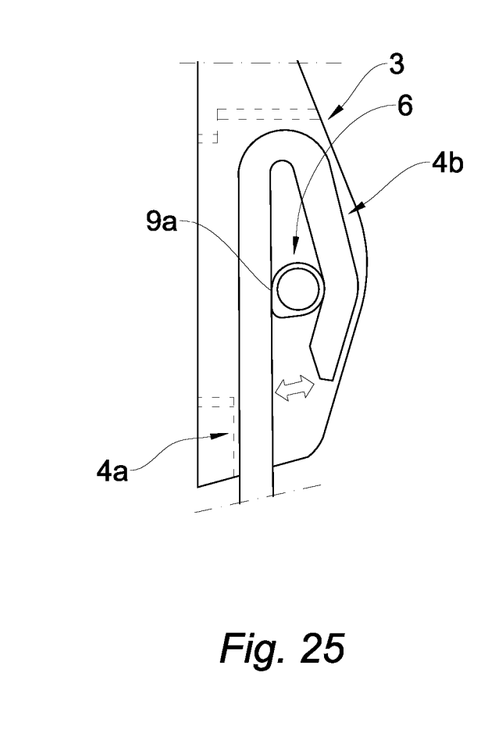
FIGS. 25, 26 and 27 are views corresponding to that of FIG. 24 and show the arm in different positions, relative to the lug, during the articulation movement about the hinge pin.
Figure 26:
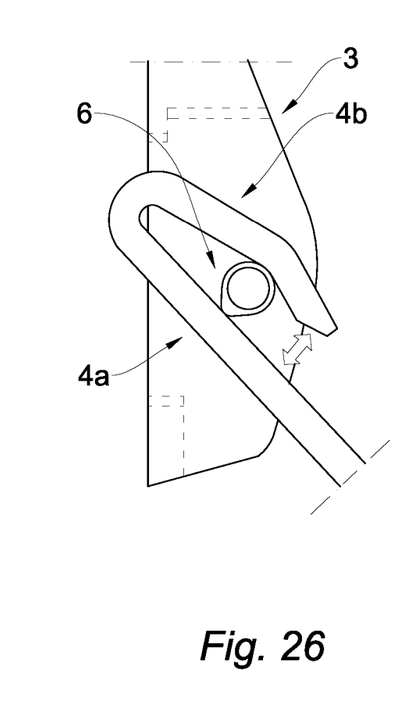

Once the pin is moved through the opening of the hook-like formation of the arm (this opening designated 18 in FIG. 24 being defined between the first arm portion 4a and the free end of the second arm portion 4b), the arm is subjected to a rotation (FIG. 18) and a subsequent traction action in the direction away from the front mount (FIG. 19) until reaching the assembly position, in which the arm is in a completely open position which is suitable for wearing the frame on the face (FIG. 20). In this position, the arm 4 is in abutment against the abutment surface 17 and the planar surface 9a of the external covering of the pin 6 is in supporting contact against the corresponding lateral surface with a planar profile of the first arm portion. Such a configuration makes the position of the open arm "stable" (FIG. 25). From the position of the open arm, the rotation of the arm in the direction of closure on the frame brings about another resilient divergence of the arm which increases as far as the intermediate position of FIG. 26, in which the pin has between the first arm portion and the second arm portion the greatest transverse dimension as a result of the eccentric formation.

Figure 27:
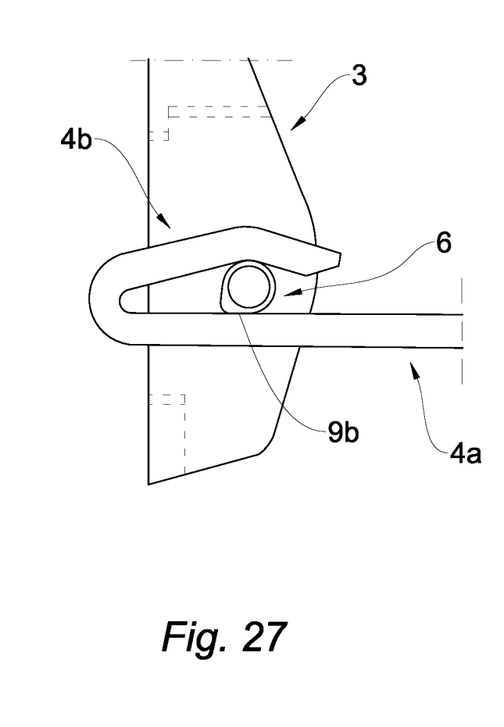

From this position, with another closing rotation of the arm, the arm is caused to reach the stable closure position which is shown in FIG. 27, in which the arm is arranged to be substantially perpendicular to the lug and in which the planar surface 9b of the external covering of the pin is in supporting contact against the corresponding surface with a planar profile of the first arm portion. Such a configuration makes the position of the closed arm "stable" with the return of the arm to the starting configuration (that is to say, with the same resilient preloading which it has with the arm in the open position).

It may be observed that, as a result of the eccentric form of the pin, the closing and opening movements of the arm are brought about with a resilient release as a result of the presence of the preloading, passing through the intermediate position (FIG. 26) of substantially unstable equilibrium (in which the pin is in contact with the first arm portion in the edge zone of the eccentric profile, straddling the planar surfaces 9a, 9b of the pin.

The invention thereby achieves the objects set out, affording a number of advantages with respect to the known solutions.

A first advantage involves the fact that with the frame according to the invention there is brought about the constant maintenance of adequate friction of the arm even in the event of possible wear phenomena as a result of the particular formation of the arm and the resilient preloading thereof which ensure a continuous compensation for the potential occurrences of connection play resulting from the wear of the materials. Another advantage is that there is produced an opening and closing movement of the arm with a "resilient release" as a result of the particular formation of the cross-section of the pin, which release ensures the stability of the two corresponding alternative configurations of the frame (with the frame being worn and folded, respectively). Such behaviour of the arm affords the double advantage of providing a high practicality in use and causing the user (or the possible purchaser) to perceive a high level of quality or construction care in the product.

Another advantage is that the operating peculiarities described above are obtained with a structure which is easy to assemble on the frame, has a particular lightness and small dimensions so as to also be able to be used in frames which are particularly slender and light.

Yet another advantage involves the construction simplification and the limited number of components of the device, which are particularly suitable for constructing spectacles with overall dimensions which are extremely small and of a particularly light type.

The invention claimed is:

1. A frame for spectacles comprising a front mount (2) with respective lateral lugs (3) which are provided for articulation of respective arms (4) in order to produce an articulated connection of each arm to the front mount, each lug (3) is provided with a hinge pin (6) which extends between a pair of surfaces (3a, 3b) of the lug which are axially opposite each other in a direction of a hinge axis, each arm (4) comprises a first arm portion (4a) which extends to a second arm portion (4b), which has a lesser longitudinal extent with respect to the first arm portion, the second arm portion (4b) being bent on the first arm portion (4a) in a position facing the first arm portion (4a), the pin (6) configured to be interposed between the first arm portion (4a) and second arm portion (4b) in order to produce a hinge type connection of the arm (4) with respect to the pin (6), and the second arm portion (4b) has a portion (7) with a concave profile which is directed towards the first arm portion (4a), the portion (7) having the concave profile at least partially surrounding the pin (6) so that relative positioning is maintained between each arm (4) and a corresponding pin (6) during a rotational movement of the arm, the frame further comprising a respective through-hole (16) in each lug (3) transversely to the direction of the hinge axis which is capable of being at least partially passed through by the first arm portion (4a) and second arm portion (4b) during the rotational movement of the arm (4) about the pin (6), the arm being connected to the pin (6) in an articulated manner by insertion of the arm through the through-hole (16), wherein the arm (4) is connected in an articulated manner to the hinge pin (6) by passing the pin through an opening (18)

of the arm which is defined between the first arm portion (4*a*) and the free end of the second arm portion (4*b*) facing the first arm portion.

2. The frame according to claim 1, wherein the second arm portion (4*b*) comprises two parts (8*a*, 8*b*) which are contiguous and angled with respect to each other and which converge in a common vertex (8*c*) in order to produce the portion (7) having the concave profile.

3. The frame according to claim 1, wherein the arm (4) is connected to the pin (6) with a resilient preloading which is obtained by a resilient divergence between the first arm portion (4*a*) and the second arm portion (4*b*) brought about during assembly of the arm with the pin.

4. The frame according to claim 1, wherein the pin (6) comprises a lateral covering which has a pair of surfaces (9*a*, 9*b*) which have a substantially planar profile and which are angled relative to each other and which are intended for supporting contact against a corresponding planar surface portion of the first arm portion (4*a*) in order to ensure stable positioning of the arm (4) in the respective opening and closing positions in relation to the frame.

5. The frame according to claim 4, wherein the planar surfaces (9*a*, 9*b*) of the pin are angled substantially perpendicularly to each other.

6. The frame according to claim 1, wherein the lug (3) comprises an abutment surface (17) of the first arm portion (4*a*) which defines a travel limit of the opening rotational movement of the arm.

\* \* \* \* \*